(12) United States Patent
Wang (10) Patent No.: US 12,391,565 B2
(45) Date of Patent: Aug. 19, 2025

(54) METHOD FOR DIRECTLY PRODUCING LITHIUM CARBONATE AND REDUCING SULFATE RADICAL CONTENT FROM LITHIUM SULFATE AND SODIUM (POTASSIUM) CARBONATE

(71) Applicant: Ailin Dai, Shanghai (CN)

(72) Inventor: Qingsheng Wang, Shanghai (CN)

(73) Assignee: Ailin Dai, Shanghai (CN)

( * ) Notice: Subject to any disclaimer, the term of this patent is extended or adjusted under 35 U.S.C. 154(b) by 769 days.

(21) Appl. No.: 17/267,289

(22) PCT Filed: Aug. 9, 2019

(86) PCT No.: PCT/CN2019/100016
§ 371 (c)(1),
(2) Date: Feb. 9, 2021

(87) PCT Pub. No.: WO2020/030123
PCT Pub. Date: Feb. 13, 2020

(65) Prior Publication Data
US 2021/0309534 A1 Oct. 7, 2021

(30) Foreign Application Priority Data
Aug. 9, 2018 (CN) .......................... 201810900977.7

(51) Int. Cl.
*C01D 15/08* (2006.01)

(52) U.S. Cl.
CPC .......... *C01D 15/08* (2013.01); *C01P 2006/80* (2013.01)

(58) Field of Classification Search
CPC ................................ C01D 15/08; C22B 26/12
See application file for complete search history.

(56) References Cited

U.S. PATENT DOCUMENTS

| | | | | |
|---|---|---|---|---|
| 3,007,770 A | * | 11/1961 | Kawecki | ................. C22B 26/12 423/551 |
| 2015/0139886 A1 | | 5/2015 | Bourassa et al. | |

FOREIGN PATENT DOCUMENTS

| | | |
|---|---|---|
| CN | 102115101 A | 7/2011 |
| CN | 102892708 A | 1/2013 |
| CN | 107673376 A | 2/2018 |
| CN | 107915240 A | 4/2018 |

OTHER PUBLICATIONS

Qin, Yunan; The Raw Material of Lithium Molybdate—The Technology and Improvement for Producing Lithium Carbonate; China Molybdenum Industry, vol. 28, No. (6), Dec. 30, 2004, ISSN: 1006-2602, pp. 26-28.

Qin, Yunan; Technology and Improvement for Producing Basic Lithium Salt—Lithium Carbonate; Chemical Engineering Design, No. No. 4, Aug. 28, 1988, ISSN: 1007-6247, pp. 12-15.

Qin, Yunan; Technology and Improvement for Producing Basic Lithium Salt—Lithium Carbonate; Fine Chemicals, vol. 1, No. 1, Mar. 2, 1990, ISSN: 1003-5214, pp. 36-38.

Qin, Yunan; Technology and Improvement for Producing Lithium Carbonate, Technology & Development of Chemical Industry, No. No. 2, Jul. 2, 1987, ISSN: 1671-9905, pp. 13-16.

Zhao, Chunlong et al.; Research Progress of Lithium Carbonate Preparation and Purification Process; The Chinese Journal of Process Engineering, vol. 18, No. (1), Feb. 28, 2018, ISSN: 1009-606X, pp. 20-28.

Zeng, Zuliang; Study on the Process of 3N Battery Grade Lithium Carbonate; Xinjiang Youse Jinshu, No. No. 51, Dec. 30, 2001, pp. 20-22.

Zhu, Zenghu et al.; Progress in Production Process of Lithium Carbonate; Journal of Salt Lake Research, vol. 16, No. (3), Sep. 15, 2008, ISSN: 1008-858X, pp. 64-72.

Hou, Wengui; Discussion on the Process of Freezing and Precipitating Sodium in Lithium Deposition Mother liquor, Xinjiang Youse Jinshu, No. No. 4, Nov. 15, 1998, pp. 28-30.

* cited by examiner

*Primary Examiner* — Stuart L Hendrickson
(74) *Attorney, Agent, or Firm* — NKL Law; Allen Xue (57) ABSTRACT

A method for reducing sulphate content in various levels of lithium carbonate in spodumene sulfuric acid method includes the steps of using a process of "reverse feeding, no circulation of mother liquor" on the basis of various impurity removal methods for existing industrial grade and battery grade products; using a "supplementary pre-precipitation impurity removal" measure before formal operation of thermal precipitation; temporarily stopping aging to obtain large and coarse lithium carbonate crystals during the thermal precipitation operation; washing the coarse lithium carbonate once under the action of stirring at high temperatures by means of 3 times deionized water, performing centrifugation, and subjecting same to strong desorption treatment to release the majority of sodium sulfate and other impurities, to obtain purified lithium carbonate; and drying and crushing the purified lithium carbonate.

2 Claims, 3 Drawing Sheets

|  | $Li_2CO_3$ | $Li_3PO_4$ | LiF |
|---|---|---|---|
| Solubility, % | 1.329, 20°C | 0.022, 0°C | 0.13, 20°C |
| Converted to Metallic Li, % | 0.2497 | 0.00396 | 0.036 |

METHOD FOR DIRECTLY PRODUCING LITHIUM CARBONATE AND REDUCING SULFATE RADICAL CONTENT FROM LITHIUM SULFATE AND SODIUM (POTASSIUM) CARBONATE

The present application claims the priority of the prior application No. 201810900977.7 submitted to China National Intellectual Property Administration on Aug. 9, 2018, which is entitled "Method for greatly reducing sulfate content in various levels of lithium carbonate in spodumene sulfuric acid method". The entire content of the prior application is incorporated herein by reference.

TECHNICAL FIELD

The invention relates to a method for producing lithium salt. In particular, the present invention relates to a method for greatly reducing the sulfate content in various levels of lithium carbonate in spodumene sulfuric acid method.

BACKGROUND

The demand for lithium cells/batteries has begun to grow rapidly, and it is likely that the demand for high-purity lithium salts, especially battery-grade lithium carbonate, will increase explosively due to the large-scale production of electric vehicles.

Lithium carbonate is mainly extracted from spodumene, lepidolite and salt lake brine. The lithium-containing resource reserves in China rank second in the world. The reserves of spodumene in Ganzi and Aba, Sichuan, lepidolite in Yichun, Jiangxi, salt lake lithium in East & West Taijinar and Yiliping, Qinghai, salt lake lithium in Zabuye Lake, Tibet are all extremely rich.

From the perspective of ingredients constituting the resource, it is more appropriate to produce lithium chloride from lithium brine in Qinghai salt lakes in China, and then to electrolyze it into metallic lithium, which in high-magnesium brine however is difficult separate due to the high similarity between the two atomic structures of magnesium and lithium, making the development of lithium chloride difficult; in addition, the natural conditions of the mining area are very difficult, and the progress has not been fast enough for many years; while the lithium content of the two solid lithium ores of spodumene and lepidolite is relatively high with respect to salt lake lithium. Lithium sulfate fluid leached by the spodumene sulfuric acid method and the lepidolite sulfate method can now reach saturation state without concentration. It is more convenient to produce industrial grade and battery grade lithium carbonate. At this stage, the extraction of lithium from ore in China still has technical advantages over the extraction of lithium from brine and expansion of production capacity thereof is also relatively rapid.

As the large-scale production technology for producing industrial grade and battery grade lithium carbonate (2N-3N grade, 99.5%-99.9%) with lithium sulfate and soda has been relatively mature (please refer to Sichuan Tianqi Lithium Industry Co., Ltd., Chinese invention patent CN107915240A, 2018 Apr. 17, a method for producing battery-grade lithium carbonate by the sulfuric acid method), and is quite advanced as compared with other enterprises producing lithium carbonate with lithium sulfate and soda in the world. Therefore, lithium carbonate produced by the spodumene sulfuric acid method is still the preferred process for most investors.

However, from the perspective of the battery-grade lithium carbonate technical standard YS/T582-2013, the biggest problem with this patented product lies in that the contents of impurities sulfate and sodium are still relatively high, which are 0.08% and 0.025%, respectively, which are 1-2 orders of magnitude higher than other impurities and stand out of the crowd. This standard is only "acceptable" to the battery industry due to the high price of 4N-grade high-purity lithium carbonate at this stage. If there is a relatively simple new technical solution, which reduce the sulfate radical in the lithium ore-lithium sulfate-battery grade lithium carbonate greatly by an order of magnitude at a relatively low cost, so that the updated standard battery grade lithium carbonate passes the 3N level and approaches or even reaches the 4N level easily and stable, the technical solution would be a great technological breakthrough, which will undoubtedly be very beneficial to improve the quality, life and reliability of lithium batteries, and may promote the faster development of new energy vehicles.

As to industrial lithium carbonate, some industries such as middle to high grade lithium glass manufacturing industries are particularly troublesome for the impurity sulfate in lithium carbonate, since the viscosity of high temperature liquid glass is remarkably high, and the sulfur oxide microbubbles produced by the decomposition of sulfate are difficult to remove by all floating for a long time, which is very disadvantage to the quality and cost and price of the glass. The zero-grade product in the current industrial standard GB/T11075-2013 has a sulfate content of 0.20%, which is although in line with the standard of the Corning Glass company in the United States; if there is a relatively simple new technical solution, which reduces the sulfate content by an order of magnitude to 0.02% at a relatively low cost and create a new zero-grade standard, such a technical solution would be a great technological breakthrough and may increase China's competitiveness in exporting the product.

Here is a brief review of the production history of industrial-grade lithium carbonate in the world. It can be known that the fact of the content of the impurity sulfate in lithium carbonate produced by the spodumene sulfate was overly high do have special reasons and "excusable":

In the earliest industrial grade lithium carbonate produced in Europe, the impurity sulfate content is generally 0.70-0.80%, which is equivalent to 1.035%-1.183% of sodium sulfate, and the arithmetic average thereof is 1.109%. Compared with many inorganic salt products, this is a bit exception.

Figure 2:
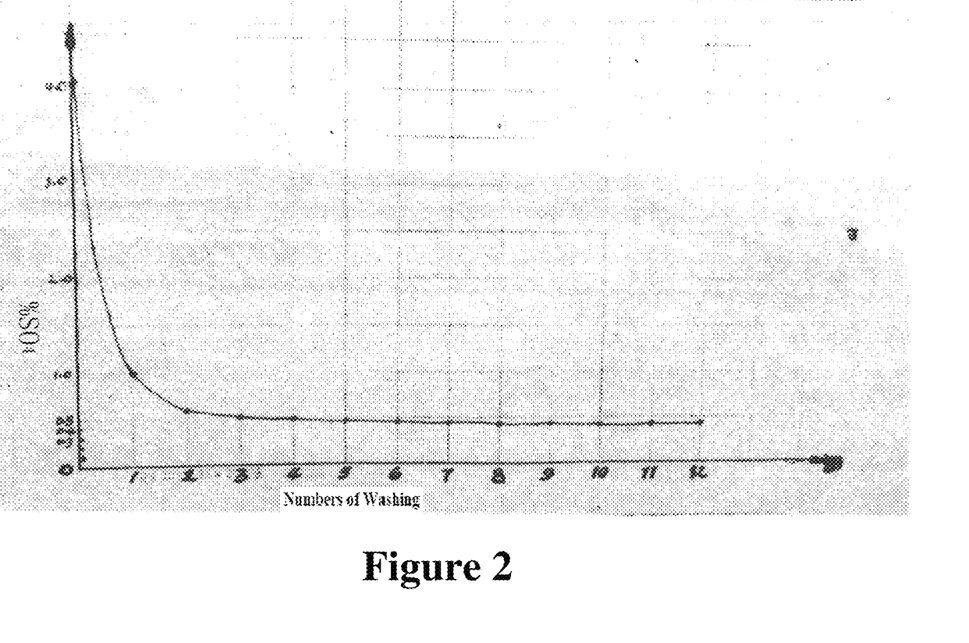
FIG. 2 is a washing curve of sulfate in a trial product produced by the process of the former Lithium of America corporation.

In the 1950s, the former Lithium of America corporation in USA developed a spodumene sulfuric acid lithium carbonate process, in whose industrial grade lithium carbonate standard, the impurity sulfate content has been lowered as comparing to that of earlier European products, with a content of 0.35% for the first grade and 0.50% for the second grade, which is still high. FIG. 2 is the sulfate reduction profile of the first batch of thermally precipitated crude lithium carbonate in the deionized hydrothermal washing process through the process of the former Lithium of America corporation in the factory served by the inventor of the present application in 1978. It clearly shows that when the sulfate drops rapidly to 0.50%, it is extremely difficult to drop by a large margin. This confirms that it is inevitable and appropriate that the sulfate in first industrial grade and the second industrial grade lithium carbonate in the process are doubtlessly 0.50% and 0.35%, respectively.

When certain industries, such as medium and high-grade lithium glass, require low-sulfate products (0.20%, the so-called Corning Glass Company standard), then the Truste Method, i.e., the carbonization method is used for purification. In this method, carbon dioxide is pressed into a lithium carbonate aqueous slurry to acidify (some called hydrogenate) the lithium carbonate into a 5% aqueous solution of lithium bicarbonate, and the impurity sodium sulfate is diluted in a large amount of water, and then the solution is heated to decompose the lithium bicarbonate to drive carbon dioxide away, lithium carbonate is re-precipitated, achieving the object of reducing sulfate to 0.20%. Although the purification process is long, the equipment investment is huge, and the cost has increased a lot, it is so far still the classic process of using lithium carbonate, including using lithium hydroxide, to produce industrial grade of the Corning specification, 3N, 4N, and 5N high-purity lithium carbonate.

According to the inventor's opinion, the key points of Tianqi Lithium's invention patent CN107915240A are "circular leaching", "EDTA complexes calcium magnesium to precipitate lithium", and the set of best operating parameters for each procedure starting from the leaching procedure which are counted and gathered during the long-term development and production. Just as mentioned in paragraph [0006], the inventor of the application deems that the above-mentioned patented technology of Tianqi Lithium involving spodumene sulfuric lithium carbonate can be further improved, with a sulfate content of 0.008% and a main ingredient content of 4N grade as the target. Of course, this needs to be enriched with new breakthrough technologies.

SUMMARY OF THE INVENTION

After more detailed theoretical analysis and several experiments, the inventor of the application has found innovative measures that do not need to add a large number of equipments and only need to modify part of the process flow, which may realize the object of reducing sulfate to 0.20% in the spodumene sulfuric acid industrial grade lithium carbonate in one fell swoop with low investment and low cost. This innovative measure is to change the classic process of the former Lithium of America corporation starting from the procedure of thermal precipitation of crude lithium carbonate from purified lithium sulfate liquid and purified soda solution (see FIG. 1. The procedure of thermal precipitation of crude lithium carbonate from purified lithium sulfate liquid and purified soda solution corresponds to mixing "20% $Li_2SO_4$ solution" with "saturated $Na_2CO_3$ solution" to "precipitate $Li_2CO_3$" in FIG. 1) drastically into the "saturated $Na_2CO_3$ solution" process.

As a result, the average sulfate content of many batches of products in our factory reaches 0.22%, and the minimum is 0.15%. It must be understood that this is the initial trial production just after technological innovation of small-scale semi-mechanical and semi-manual production under the condition of simple equipment, site conditions, and limited staff quality and business management level. At that time, there was full confidence that once the equipment, site, production management and other conditions were ameliorated and improved, one may follow this new process and reduce sulfate to 0.10%, which is at the same level as the special grade lithium carbonate produced by the lithium hydroxide carbonization method in the Xinjiang Lithium Salt Factory. As for the special specification lithium carbonate processed by our factory for a certain electron tube factory, 10 tons of products before and after the period of time, after putting together and mixing, reached 0.25%, and the total yield of lithium was about 80%; and successfully delivered in the next year, and the processing fee was 10,000 CNY per ton, and the profit was gained.

"reverse feeding without mother liquor circulation" refers to: 1. from the time when the purified lithium sulfate saturated solution and the soda solution are used to thermally precipitate lithium carbonate, the soda solution is added to the lithium sulfate solution in the classic operating process of the former Lithium of America corporation (which may be referred to "forward feeding"), and the above "forward feeding" procedure is reversed; so the lithium sulfate solution is slowly and dispersedly added to the vigorously stirred soda solution at a temperature of 90-95 degrees Celsius to precipitate crude lithium carbonate.

2, The crude lithium carbonate was separated by the SS-800 three-leg centrifuge commonly used by small businesses at that time, and after the sodium sulfate primary hot mother liquor was frozen to below 0 degrees Celsius to crystallize mirabilite, the secondary cool mother liquor is not returned to the acidified material leaching process to recover lithium like that in the former Lithium of America corporation's process; instead, another process route is established to heat and concentrate the secondary cool mother liquor containing up to 15-18 g/l of lithium carbonate until the sodium sulfate crystal membrane on the liquid surface begins to form (during the concentration process, a slight excess of soda is retained in the mother liquor, and crude lithium carbonate is gradually thermally precipitated). The crude lithium carbonate is filtered out while it is hot and returned to the acidified material leaching procedure or accumulated to a certain amount, and then it is separately elutriated and purified into industrial second grade product; the tertiary hot mother liquor from which crude lithium carbonate is filtered out is hot and combined into a new primary hot mother liquor after lithium precipitation to precipitate mirabilite, the operation of "cold precipitation of mirabilite-hot precipitation of crude lithium carbonate" is performed crossover.

In fact, if our factory had the conditions to improve the laboratory and workshop facilities, train personnel, and continue production, based on the "reverse feeding without mother liquor circulation" technological innovation, and supplemented by the following "supplementary removal of impurities by pre-precipitation" measures, then the quality of 0.10% sulfate and 99.0% main ingredient content may be achieved. The calcination and transformation, acidification, leaching, and impurity removal of the former Lithium of America corporation's process and operation parameters are mostly advanced and feasible.

The inventor of the present application had noticed the importance of full flocculation, co-precipitation, and multiple removal of colloidal impurities in the operation of removing silicon, aluminum, iron, magnesium, calcium and heavy metals by the precipitation method. The experience gained is that before the formal operation of thermal precipitation of crude lithium carbonate, taking the measures of "supplementary removal of impurities by pre-precipitation" has very good effects. Its method include: firstly, into the purified lithium sulfate solution, a small amount of soda solution is added according to the "forward feeding" way. When the emergence of white fine precipitates is just observed, the feeding is stopped, stirring is continued for a quarter of an hour or more. The mixture is pumped into a suction filter barrel to be filtered under micro vacuum. At the initial stage, a large amount of precipitate inevitably passes through the filter. The filtrate is pumped out for circulating filtration. After the filter cake is successfully bridged and the filtrate sampling observation is completely clear, the filtrate circulation is stopped, and the filtrate is confirmed as the completely purified liquid. The filter cake is white, delicate and slippery, mixed with a small number of coarser particles (lithium carbonate), indicating that impurities such as silicon, aluminum, magnesium, calcium have been purified well. After testing, as long as the quality of soda is good, the dissolution and purification operations are also errorless, the formal thermal precipitation operation may be started.

The two innovative processes of "reverse feeding without mother liquor circulation", "supplementary removal of impurities by pre-precipitation" are matched. After the "supplementary removal of impurities by pre-precipitation" operation is completed, if industrial second grade lithium carbonate is to be produced, a thermal precipitation operation may be carried out in the "forward feeding" mode; if a first grade, zero grade lithium carbonate is to be produced, the operation may be carried out in the "reverse feeding" mode.

In addition, passing through the filter is very harmful. Regardless of in a drum suction filter, press filter, leaf filter, plate and frame filter, the formal filtrate can be intercepted after the filter residue on the filter cloth is bridged, and the previous filtrates are all returned to the circulating filtration. Otherwise, the removal of impurities often is just one step short of success. From the beginning of the filtration of saturated lithium sulfate solution and soda solution to the end of the centrifugation of the refined lithium carbonate, cotton fiber filter cloth is replaced with synthetic fiber filter cloth to prevent cotton fiber from falling off and mixing into the finished product.

The inventor of the present application succeeded in recovering lithium phosphate with relatively low solubility in water by using the secondary cool mother liquor (see FIG. 3), in the hope that the recovery process of sodium sulfate from the mother liquor becomes simpler. However, because there was no demand for lithium phosphate in the market at that time, the actual production was based on the "cold precipitation of mirabilite-hot precipitation of crude lithium carbonate" scheme to recover lithium and sodium.

Figure 3:
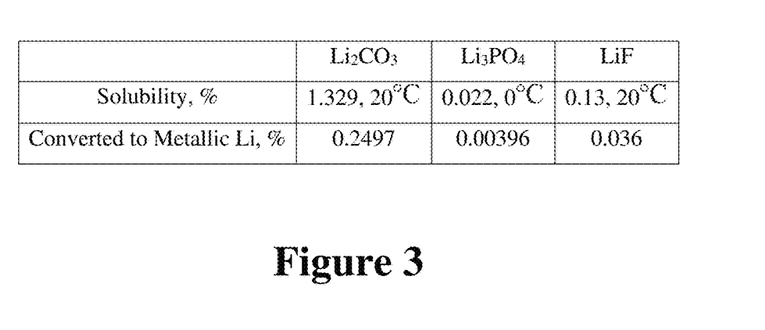
FIG. 3 is the solubility data of lithium phosphate, lithium fluoride, and lithium carbonate in water.

There are demand of many kinds of lithium products in the market now, and the secondary cool mother liquor after "hot precipitation of lithium, cold precipitation of mirabilite" can be used to recover lithium phosphate with phosphoric acid and sodium dihydrogen phosphate; to recover lithium fluoride with hydrofluoric acid and sodium hydride fluoride; to recover lithium stearate with sodium stearate, and then anhydrous sodium sulfate is continuously recovered by vacuum multi-effect concentration. If lithium phosphate (for lithium batteries) is recovered, because of its low solubility in water, the loss of lithium taken away by anhydrous sodium sulfate is the lowest, which is still a better choice. FIG. 3 is the solubility data of lithium phosphate, lithium fluoride and lithium carbonate in water, presenting a huge difference of an order of magnitude, indicating that the solution for recovering lithium and sodium is better.

A better recovery solution is as follows: to the south of Chengdu, Sichuan, from Xinjin, Meishan, Pengshan to Hongya and Danling of Ya'an City are the production areas of spodumene sulfuric acid lithium products, which also happen to be the production areas of massive glauberite and anhydrous sodium sulfate manufacturers. The mirabilite mother liquor after the recovery of lithium phosphate (due to the large salt effect, the metal lithium content is still 50 ppm or more; if there is ion exchange or membrane separation and recovery technology, it should be recovered), and supplied to the nearest anhydrous sodium sulfate manufacturer for using as a leaching solution for extracting glauberite, which can achieve a "win-win" situation: the mirabilite manufacturers greatly reduce the cost; the lithium salt manufacturers can avoid the huge equipment and plant investment of vacuum triple-effect concentration, and reduce the energy consumption cost.

However, regardless of whether it is recovered by itself or supplied to other factories for recovering anhydrous sodium sulfate, when the lithium content of the mother liquor is enriched to a certain concentration, it is advisable to recover the lithium therein again.

Analysis of the technical principles of the "reverse feeding without mother liquor circulation" process innovation: 1. Among the impurity indicators of the industrial grade lithium carbonate national standard GB/T11075-2013 and the battery grade lithium carbonate department standard YS/T582-2013, the content of sulfate and sodium are almost higher than other impurities 1-2 orders of magnitude, indicating it is difficult to remove.

2, The essential reason is largely because that due to the structural characteristics of lithium ions, it is easy to form coordination bonds with oxoacid radicals containing silicon, carbon and sulfur, that is, during thermal precipitation of crude lithium carbonate, it is easy to produce chemical adsorption of low sulfate, produce encapsulation and form peritectoid. In particular, the adsorbed sulfate in the initial stage of thermal precipitation will become bigger with the coarse lithium carbonate particles, and will even be deeply encapsuled, which is the most harmful. Although alkali metals and alkaline earth metal elements are not as highly polarized as transition elements, they can be used as central atoms to form complexes with coordination atoms. Sulfate has two coordination oxygen atoms, which can easily form complexes having larger stability constants with the lithium ions in lithium carbonate; such fact also applies to carbonate and silicate.

3, In this case, then it is necessary to analyze the theory of adsorption and desorption on solid surfaces in more detail: according to the Langmuir theory of solid surface adsorption phenomena in physical chemistry, when crude lithium carbonate particles are precipitated and washed at a relatively high temperature of 90-95 degrees Celsius, the particles have weak physical adsorption force based on van der Waals forces, but have a greater tendency to desorption. Since there are two coordinating oxygen atoms in the sulfate that can be used as the coordination sites of the complex; when the crude lithium carbonate is precipitated, under the circumstances that the sulfate concentration is high, the probability forming a sulfate complex with a large stability constant is remarkably high. The adsorption of sulfate on the surface of coarse lithium carbonate particles is mainly chemical adsorption, the adsorbent is lithium ion, and the adsorbate is sulfate. Several other characteristics of chemical adsorption are: a. a high selectivity. During the thermal precipitation reaction, the lithium carbonate particles have vigorous adsorption of sulfate and carbonate. Which is more likely to be adsorbed depends on the concentration of adsorbate, because the Freundlich adsorption equation indicates that the adsorption capacity increases with the increase of the adsorbate concentration. b. Only single layer adsorption occurs. This is because the chemical adsorption is completed by the remaining bond force of the molecules on the surface layer of the solid molecule to form a new chemical bond with the adsorbate, so when the surface is adsorbed and saturated, the adsorbate with the same charge will no longer be adsorbed to form a second adsorption layer. c. Heat is released during adsorption, which is not easy to reverse, that is, it is difficult to desorb and needs to absorb heat. Such chemical adsorption also promotes the encapsulation of sulfate in the process of crystal growth, because once the sulfate are adsorbed on the lithium carbonate particles, it is not easy to desorb, and subsequently lithium carbonate molecules coordinated with the sulfate will be adsorbed from outside to form an encapsulation of sulfate, that is, peritectic formation, which makes it difficult for conventional washing methods to desorb and remove sulfate from lithium carbonate particles, and whose high content is naturally inevitable.

4, From the perspective of the two factors of adsorbate and adsorbent, production practice has proved that the former has a greater impact on the content of impurity sulfate.

5, According to the above theoretical analysis, for reducing the content of the impurity sulfate, it is most important to reduce the concentration of adsorbate sulfate during the thermal precipitation reaction as much as possible, secondly, to adopt the "slow, hot, aging" operation method to obtain crude lithium carbonate particles with large particle size, so as to reduce sulfate chemically adsorbed and encapsuled; the last measure is to seek a relatively simple, low-input, low-cost and powerful new desorption technology, which releases the chemically adsorbed and deeply encapsulated sulfate that is difficult to remove by existing hot washing method.

Following this logically, "reverse feeding without mother liquor circulation" comes out. "Reverse feeding" is deduced based on the principle that chemical adsorption simultaneously has selective adsorption, single-layer adsorption, and difficult desorption: at the beginning of feeding, the nascent lithium carbonate tiny particles are in an environment of high concentration of carbonate and low concentration of sulfate. Therefore, on their surface, the probability of adsorbing carbonate is high and the probability of adsorbing sulfate is low; and only a few parts adsorb sulfate radicals (as well as silicate). While, due to the characteristics of monolayer adsorption, the surface of lithium carbonate particles will no longer adsorb electronegative sulfate and carbonate after adsorbed carbonate and saturated, because the adsorbed carbonate is not easy to desorption reversely, and in turn they will rapidly adsorb free electropositive lithium ions (then sodium ions) and adsorb carbonate and lithium ions crossover. Lithium carbonate particles can rapid grow in a low-concentration sulfate environment, the amount of the adsorbed sulfate is much less than that of the "forward feeding" process.

A part of the layer of carbonate adsorbed by the precipitated lithium carbonate particles will adsorb sodium ions and become sodium carbonate molecules. This will not cause major trouble: firstly, these sodium carbonate molecules will chemically adsorb lithium ions dissociated from the continuously added lithium sulfate, and then a chemical reaction occurs to precipitate lithium carbonate, which has a much lower solubility than sodium carbonate, making the lithium carbonate particles larger, and the precipitated sodium ions will be absorbed by the sulfate in the reaction solution and transferred into the solution; secondly, sodium carbonate and lithium carbonate will not produce double salt, and it is easier to wash off when washing with hot water in the subsequent processes. Of course, there will be a small amount of sodium ions and sulfate close to each other to form sodium sulfate, and they will be encapsuled by the later adsorbed lithium carbonate, which is difficult to be washed off. The amount thereof is slightly less than the equivalent sulfate (because traces of sulfate of other metal elements are encapsuled), becoming runner-up in impurity content.

The "reverse feeding" process uses high-concentration adsorbate carbonate to preemptively complex the lithium ions in the nascent lithium carbonate particles, preventing a large amount of sulfate from complexing with the adsorbent lithium ions in the lithium carbonate particles and being encapsuled, successfully reducing sulfate content in the product. After adopting "reverse feeding", the crude lithium carbonate only needs to be hot washed with deionized water according to a ratio of 1:2-3 for 3 times, and the product of 0.15%-0.20% of sulfate can be obtained, while 30 kg of high-quality lithium carbonate can be obtained per each barrel after reaction, only 5 kg more soda than the original process, partly mixed into the primary sodium sulfate hot mother liquor (partly into the washing water), and then a part of it will be automatically consumed when the secondary cool mother liquor is "thermal precipitation of crude lithium carbonate". It is financially worthwhile.

The operation principle of "slow, stir, heat and age" in the process of thermal precipitation of crude lithium carbonate is introduced as follows. It is well known that large lithium carbonate particles can be obtained through the above procedures, reducing the adsorption and encapsulation of sulfate. It is based on the following theories: 1. Langmuir theory, the smaller the adsorbent surface, that is, the larger the particle size, the smaller the amount of adsorption; 2. Kelvin formula, aging can automatically convert small crystals into large crystals (the free energy of the system decreases and tends to be stable). In this conversion process, under the conditions of stirring and heating, a part of the adsorbed and encapsulated sulfate and sodium ions can be released into the reaction solution; however, due to during the early stage of the reaction, sulfate adsorbed by the nascent lithium carbonate particles have been deeply encapsuled; in the late stage of the reaction, the sulfate concentration in the reaction solution is already quite high, under the dynamic reversible state of adsorption-desorption, the amount of sulfate adsorbed and encapsuled in the lithium carbonate particles is still too high, new technological breakthroughs are still needed to solve this problem; 3. Le Chatelier principle, increasing the temperature is in favor of desorption.

In the initial stage of thermal precipitation of lithium carbonate, especially in the case of fast feeding and poor stirring, the hot precipitate often has vigorous viscosity. The reasons are as follows: a. The concentrations of the four main ions in the two hot feed liquids of lithium sulfate and soda both are very high and the reaction trend is vigorous. The lithium ion of the nascent lithium carbonate is easily coordinated with carbonate, sulfate, and silicate to form a complex salt. The lithium ion has an outer layer of acid radical, the acid radical has a layer of lithium ion, and the lithium ion has another outer layer of acid radical . . . , they are quickly self-adhesive to each other into a mass; these lithium ions will also bond to the inner wall consisting of silicate of the glass-lined reaction tank or stirrer. This is a rapid entropy increase process, and its driving force is great. However, as time goes by, the mass relaxes and collapses due to the continuous adjustment of various internal chemical bonds, the lithium carbonate particles in the mass continue to precipitate and automatically grow into large crystals, sulfate continues to combine with sodium ions to dissolve in hot water; only little mass continue to bond to the wall or stirr (and some are not bonded). b. If the desiliconization of lithium sulfate and soda is not effective, lithium silicate will be generated during thermal precipitation, which is very viscous, will increase the self-adhesive force of lithium carbonate particles, which will easily agglomerate after drying. The liquid lithium silicate with high modulus (4-5 moulds, up to 8-9 moulds) as concrete sealant is very firm after drying and solidification, no longer afraid of long-term immersion in water. This is because liquid lithium silicate has a characteristic that once dehydrated, it will never re-dissolve in water, which is very different from water glass, i.e., sodium silicate.

The operation of "without mother liquor circulation" further reduces the sulfate concentration of the thermal precipitation lithium carbonate reaction solution, so that the beneficial effect of the "reverse feeding" reducing the adsorption and encapsulation of sulfate are superimposed; also, because the salt effect of sodium sulfate is reduced, the primary yield of coarse lithium carbonate is slightly improved, which is also a very important matching innovation measure.

The above technical principles are also to clarify that to further reduce the sulfate and sodium content in lithium carbonate, the principles of these adsorption-desorption technologies can still be continuous followed.

The technical problems to be solved by the invention is that: 1, On the basis of the existing production technology and product standard GB/T11079-2013 for the production of industrial grade lithium carbonate from purified lithium sulfate solution and soda or purified potassium carbonate solution through thermal precipitation process, further innovating some processes to greatly reduce the content of the impurity sulfate to 0.03% of the "new zero grade"; considering the reduced value of impurities such as sodium and chloride, the main ingredient content is increased to 99.50%; the "new first grade" sulfate corresponds to 0.10%, and the main ingredient content is increased to 99.35%.

2, On the basis of the existing production technology and product standard YS/T582-2013 for the production of battery grade lithium carbonate from purified lithium sulfate solution and soda or purified potassium carbonate solution through thermal precipitation process, further innovating some of the processes to greatly reduce the content of the impurity sulfate to 0.010%-0.008%, considering that the content of impurities such as sodium and chloride is simultaneously reduced, the main ingredient content of battery grade lithium carbonate steadily reach 3N grade, and strive to reach 3.5N and sprint close to 4N grade for some products. The inventor of the present application deems that the limit of the main ingredient content value of lithium carbonate produced by the thermal precipitation method from lithium sulfate solution and soda or potassium carbonate solution is possibly 4N.

The present invention solves its technical problems through the technical solutions: 1. For the production of industrial first grade and zero grade lithium carbonate and battery grade lithium carbonate by the thermal precipitation method of lithium sulfate and soda, various methods for removing impurities silicon, aluminum, iron, magnesium, calcium, heavy metals and magnetic metals before the thermal precipitation process are substantially unchanged; if necessary, the "supplementary removal of impurities by pre-precipitation" measure of the present invention can be chose to supplement.

2, The soda formula is equivalent to 105% or slightly more.

3, The purified lithium sulfate and soda solutions are thermally precipitated following the "reverse feeding without mother liquor circulation" manner and subsequent operations. The so-called "reverse feeding without mother liquor circulation" process refers to: 1) from the time when the purified lithium sulfate saturated solution and the soda solution are used to thermally precipitate lithium carbonate, the soda solution is added to the lithium sulfate solution in the classic operating process of the former Lithium of America corporation (which may be referred to "forward feeding"), and the above "forward feeding" procedure is reversed; so the purified lithium sulfate solution is dispersedly in appropriate rate added to the vigorously stirred purified soda solution at a temperature of 90-95 degrees Celsius to precipitate crude lithium carbonate; 2) The crude lithium carbonate was separated by a centrifuge, and after the sodium sulfate primary hot mother liquor was frozen to below 0 degrees Celsius to crystallize mirabilite, the classic operating process of the former Lithium of America corporation (the secondary cool mother liquor is returned to the acidified material leaching process to recover lithium) is no longer followed; instead, another process route is established to heat and concentrate the secondary cool mother liquor containing up to 15-18 g/l of lithium carbonate until the sodium sulfate crystal membrane on the liquid surface begins to form (during the concentration process, a slight excess of soda is retained in the mother liquor, and crude lithium carbonate is gradually thermally precipitated). The crude lithium carbonate is filtered out while it is hot and returned to the acidified material leaching procedure or accumulated to a certain amount, and then it is separately elutriated and purified into industrial second grade product; the tertiary hot mother liquor from which crude lithium carbonate is filtered out is hot and combined into a new primary hot mother liquor after lithium precipitation to precipitate mirabilite, the operation of "cold precipitation of mirabilite-hot precipitation of crude lithium carbonate" is performed crossover.

4, A major modification was made to the operation of the thermal precipitation process, that is, not seeking to obtain coarse lithium carbonate crystals with large particle size for the time being, and the thermal aging is shifted to the desorption steps described in paragraph [0059] and paragraph [0060] to being finished together. This is to reduce the deep encapsulation of impurities such as sulfate and sodium ions in a high-concentration environment. It does not care that the thus increased number of the lithium carbonate particles with fine particle size temporarily adsorb these impurities on the surface, which are easier to be released during the hot stirring, washing and centrifuging operation for the first time and the desorption procedure operation of paragraph [0059] and paragraph [0060]. For this reason, it is possible to appropriately speed up the feeding rate of the purified lithium sulfate solution, that is, to cancel the aging duration design part of the original feeding duration, but the dispersed and multi-point arranged feeding device remains unchanged.

5, The crude lithium carbonate obtained by thermal precipitation is hot stirred, washed and centrifuged with 3 times the weight of deionized water first to reduce sulfate in the industrial grade and battery grade to below 0.40% and 0.30%, for use.

6, Under low speed stirring, the operation measures of increasing temperature to vigorously desorb parallel to keeping warm and aging are used to release most of the deeply encapsulated water-soluble impurities and other impurities represented by sodium sulfate into the water.

7, Then a hydrocyclone is used to separate the liquid phase with more micro-particle water-insoluble impurities released. According to the turbidity of the liquid phase, centrifugal rinsing or re-heating and stirring once is carried out to obtain refined lithium carbonate. The original drying and crushing methods and equipment remain unchanged.

The beneficial effects of the present invention are: relatively simple solutions, less equipment investment and lower cost can be used to greatly reduce the content of impurity sulfate and impurity sodium in industrial grade and battery grade lithium carbonate produced through thermal precipitation process from the lithium sulfate extracted from solid lithium ore such as spodumene and lepidolite and soda; the product quality of these two types of lithium carbonate is greatly improved. This may make full use of one of China's advantageous resources-solid lithium ore. With more cost-effective products, it can help the rapid development of lithium battery vehicles and consolidate China's international position in the lithium salt industry.

EMBODIMENTS

Figure 1:
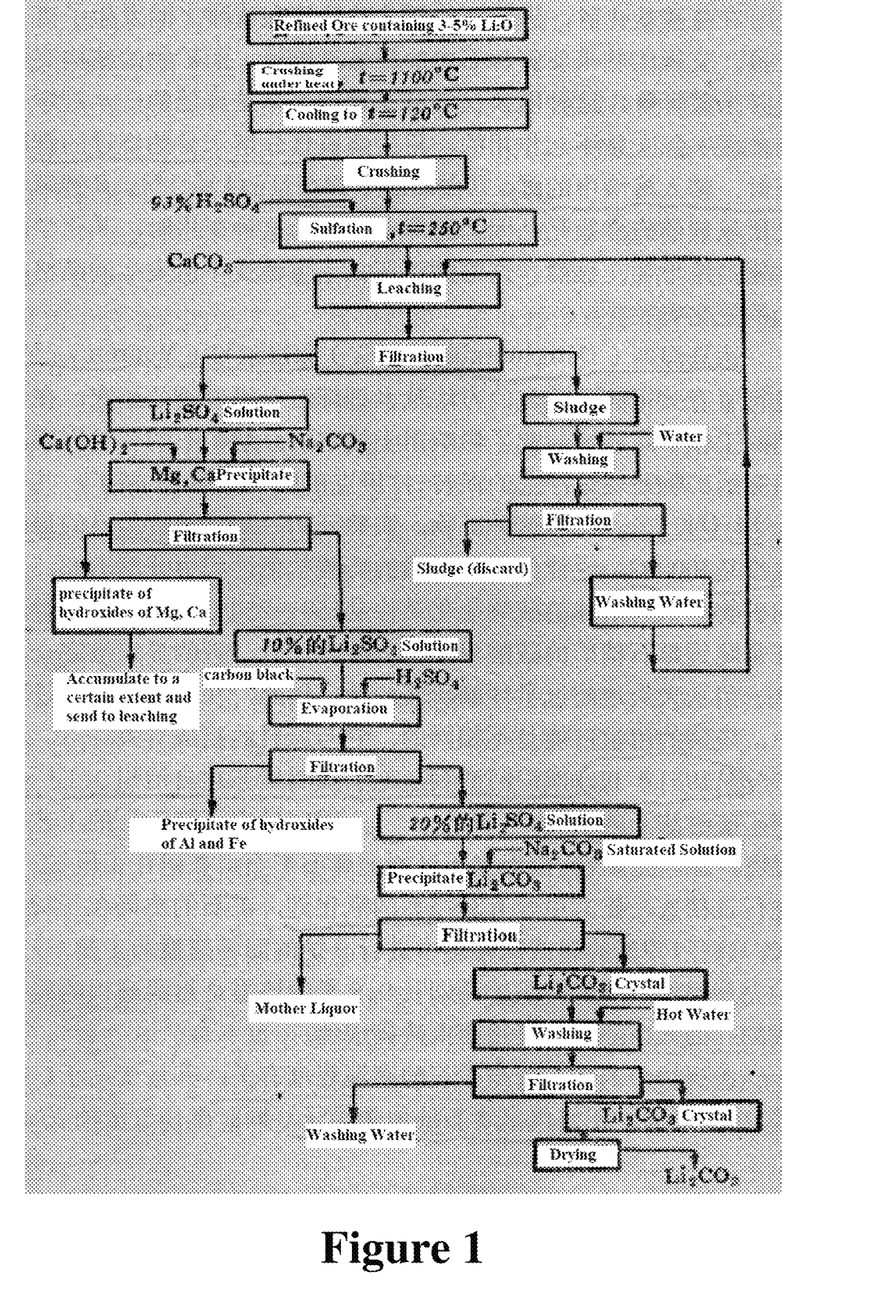
FIG. 1 is a schematic diagram of the process flow for treating spodumene by the sulfuric acid method.

FIGS. 1-4 are described in detail as follows. FIG. 1 is a schematic diagram of the process flow of the traditional sulfuric acid method for treating spodumene. FIG. 1 is from Ostrosko et al., "Chemistry and Technology of Lithium", published by China Industry Press, Beijing, first edition, May 1965, page 160.

FIG. 2 is the washing curve of sulfate in the trial product produced according to the "forward feeding" process of the Lithium of America corporation at the initial stage of the small-scale spodumene sulfuric acid method lithium carbonate production by the inventor in 1978-79 (that is, washing-reduction curve in the crude lithium carbonate produced by thermal precipitation in the sulfuric acid lithium carbonate process). This curve is sufficient to show that the biggest shortcoming of this traditional process lies in the high impurity sulfate. The washing conditions are: crude $Li_2CO_3$: distilled water-1:1.5, temperature 90-95° C., stirring time 30 minutes, centrifuge 1,300 revolutions/minute and spin dry.

FIG. 3 is the solubility data of lithium phosphate, lithium fluoride, and lithium carbonate in water, presenting a huge difference of an order of magnitude successively.

Figure 4:
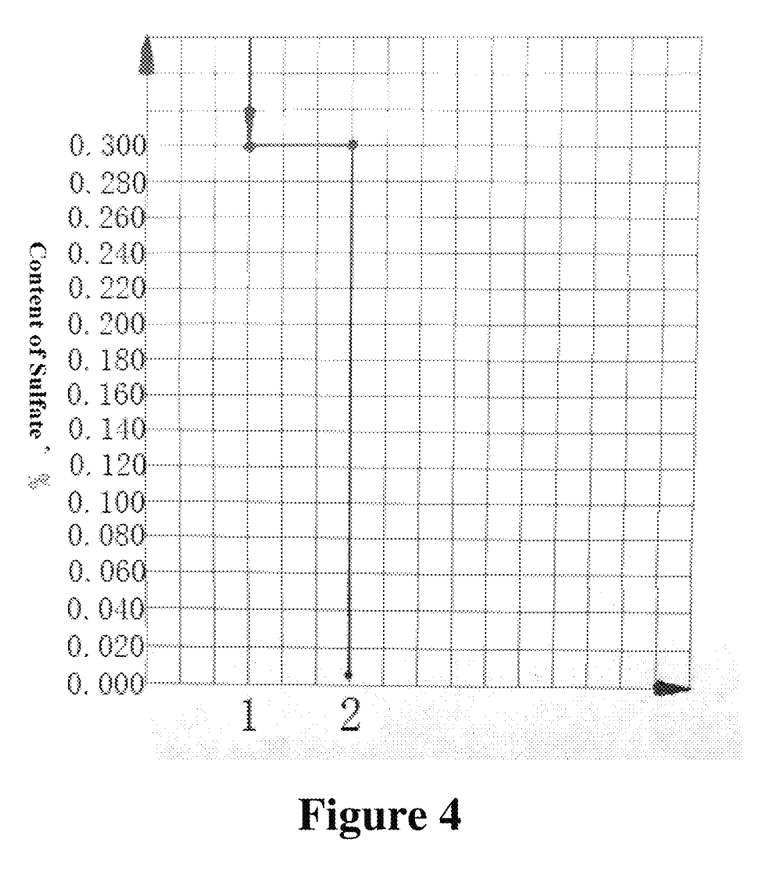
FIG. 4 is the sulfate reduction curve after implementing the method of the present application.

FIG. 4 is the sulfate reduction curve for removing impurity by thermal pressure desorption of battery-grade lithium carbonate after implementing the method of the present application. 1. represents heat stirring and washing; 2 represents heat pressure desorption once.

The method of this application for greatly reducing the sulfate content in various grades of lithium carbonate in the spodumene sulfuric acid method includes the following steps: 1. The crude lithium carbonate precipitated by heat is stirred and washed once with 3 times deionized water at 90-95 degrees Celsius; after about 15 minutes centrifugation, the sulfate in the industrial grade crude lithium carbonate is controlled below 0.40%, which corresponds to the new zero grade and new first grade products; for battery grade, is controlled below 0.30%.

2, According to a ratio of 1:6-7 between the crude lithium carbonate to be processed and deionized water, these two are add into a stainless steel ($0Cr_{18}Ni_9Ti$) or titanium plate-lined composite steel plate reaction tank with low-speed stirring, heating and cooling jacket, low-speed stirred and hold for about 1 hour (including the aging duration) at 0.4-0.6 MPa saturated steam pressure (about 150-160 degrees Celsius), for vigorous desorption processing.

3, After the pressure in the tank drops to 0.05 MPa, the slurry subjected the desorption processing is pressed into the hydrocyclone to separate the solid and liquid phases; if the turbidity of the liquid phase is large, it indicates that the water-insoluble impurities in the crude lithium carbonate are too high, the desorption effect is obvious, and it needs to be stirred and washed again before transferring the refined lithium carbonate to the drying process; if the turbidity of the liquid phase is low, it can be directly continuously centrifuged and rinsed and transferred to the drying process. After the battery grade crude lithium carbonate is desorbed, as long as the separation solution is slightly turbid, it must be heated, stirred and washed again to be recognized as refined lithium carbonate.

4, Optionally, low-speed spherical or cylindrical desorbers can be used, which is made of $0Cr_{18}Ni_9Ti$ or titanium-lined composite steel plate.

5, Optionally, various types of continuous external heating desorbers can be designed, which have the same material as those in paragraph [0061].

6, The glass-lined design of the inner wall of the desorber needs to be tested with feed in advance to detect the dissolution of boron, aluminum, silicon, lead, antimony and other elements in the lined glass under alkaline slurry and long-term high temperature stirring conditions, and then choice is made.

The drying and crushing procedure can be completed by using traditional equipment.

A static vigorous desorption bench-scale test performed by the inventor of the present application shows that if the thermally precipitated crude lithium carbonate for producing industrial grade lithium carbonate is first heated, stirred and washed with 3 times deionized water until the sulfate drops to 0.35%, and then thermally insulated for 0.5-1 hour in a simple external heating desorption thermal aging device add 6 times deionized water, filtered under suction and rinsed once after cooling, the sulfate will drop by an order of magnitude. By the barium sulfate method (gravimetric method) testing, almost no white precipitate of barium sulfate is observed. After standing and aging for 24 hours, shaking the erlenmeyer flask, only a small amount of precipitate floated at the bottom.

Although the specification of this application takes spodumene sulfuric acid method lithium carbonate as an example to illustrate the innovative technology of industrial grade and battery grade lithium carbonate, its application is not limited to this. It can actually include the circumstances for precipitating crude lithium carbonate from lithium sulfate obtained by all methods subjected to thermal precipitation with soda: the raw materials include lepidolite and other lithium-containing ores, and the water-soluble anions that bind lithium also include chloride, nitrate, and organic acid radical such as acetic acid. Alkali also includes potassium carbonate. As far as the production of insoluble lithium salts is concerned, most of the low-content impurities other than sodium sulfate are also accompanied by desorption. To expand further, as for any product that is precipitated by the reaction of two or more water-soluble raw materials, has chemical adsorption, deep encapsulation, and has limited effect on removing impurities by the conventional washing method, may be processed to greatly reduce the impurity content according to the method of the present invention, and thus are included in the scope of the claims of this application.

In the summary and specific embodiments of the patent application of the present invention, in order to illustrate "vigorous desorption" and "hydrocyclone separation" (the two are collectively referred to as "efficient desorption"), the number of initial washings and the ratio of deionized water to crude lithium carbonate; the ratio of deionized water and operating temperature, pressure, duration and other parameters of vigorous desorption, hydrocyclone separation operating parameters are listed, but these are only exemplary, but not limited to this. These parameters together form a whole and achieve the goal of further reducing the sulfate and other impurities in lithium carbonate. However, according to the different requirements of different customers for product quality, according to the differences in specific conditions such as the manufacturer's equipment, these parameters need to be adjusted and can be adjusted, and there is no and should be no subjective restrictions and third-party restrictions. As long as the method of increasing the temperature for desorption and the hydrocyclone separation method are used to separate the solid and liquid phases to achieve the purpose of removing impurities adsorbed and encapsuled in the insoluble and slightly soluble solid particles precipitated from the liquid, no matter how these parameters are adjusted, it is included in the scope of the claims of the present patent application of the invention.

The invention claimed is:

1. A method for producing lithium carbonate, comprising:
S1: crushing an ore containing $Li_2O$ and adding water to form a slurry;
S2: sulfating the slurry;
S3: leaching and filtering the sulfated slurry to obtain a filtered solution containing lithium sulfate;
S4: precipitating Ca and Mg ions from the filtered solution and separating precipitated Ca and Mg compounds from the filtered solution to obtain a second solution containing lithium sulfate;
S5: concentrating the second solution obtained from S4 to form a third solution containing 20% of lithium sulfate and separating Al and Fe ions from the third solution to obtain a first purified lithium sulfate solution; mixing a lithium carbonate solution to the first purified lithium sulfate solution until the mixed solution appears turbid, stirring the mixed solution for a quarter of an hour, and filtering the mixed solution to obtain a second purified lithium sulfate;
S6: heating the second purified lithium sulfate solution to 90-95 degrees Celsius, then adding the second purified lithium sulfate solution to a saturated sodium carbonate solution to form crude lithium carbonate in the mixture;
S7: separating the crude lithium carbonate from the mixture to obtain a primary hot mother liquor, cooling the primary hot mother liquor to below 0° C. to precipitate mirabilite, centrifuging out the mirabilite to obtain a secondary cool mother liquor, concentrating the secondary cool mother liquor to form a crude lithium carbonate;
S8: filtering out the crude lithium carbonate to obtain a tertiary hot mother liquor, combining the tertiary hot mother liquor with the primary hot mother liquor to precipitate mirabilite; and
S9: repeating S7 and S8 alternately to reduce a content of sodium sulfate of the crude lithium carbonate;
S10: washing the crude lithium carbonate obtained in S9 with deionized water having a volume 3 times that of the lithium carbonate at 90-95 degrees Celsius for 15 minutes under stirring, and obtaining a washed lithium carbonate by centrifugation;
S11: mixing the washed lithium carbonate with deionized water in a tank that is a 0Cr18Ni9Ti stainless steel or titanium plate-lined composite plate tank having a heating and cooling jacket, to desorb sodium sulfate adsorbed on the washed lithium carbonate and to hot-age the washed lithium carbonate under a saturated steam pressure of 0.4-0.6 MPa and a temperature of 150-160° C. for 1 hour; and
S12: reducing the pressure in the tank to 0.05 MPa, pressing a content in the tank into a hydro cyclone to separate into a liquid phase and a lithium carbonate slurry, further purifying the lithium carbonate slurry by centrifugal rinsing or hot stirring, washing and centrifugation to obtain a refined lithium carbonate having a sulfate content of 0.03% or less; and
drying the refined lithium carbonate.

2. The method according to claim 1, wherein the tank is a spherical or cylindrical in shape.

* * * * *